United States Patent

Demick et al.

[19]

[11] Patent Number: 6,059,358

[45] Date of Patent: May 9, 2000

[54] SEAT BACK MOUNTED FOLD DOWN AUTO OFFICE

[75] Inventors: Robert L. Demick, Eastpointe; Howard R. Nordlund, Bloomfield Hills; Larry E. Halse, Milford, all of Mich.

[73] Assignee: Johnson Controls Technology Company, Plymouth, Mich.

[21] Appl. No.: 09/222,262

[22] Filed: Dec. 28, 1998

Related U.S. Application Data

[60] Provisional application No. 60/070,328, Jan. 2, 1998.

[51] Int. Cl.[7] .................................................. A47C 7/72
[52] U.S. Cl. ............................ 297/188.04; 297/188.01; 297/188.07; 297/146; 297/125; 297/217.6; 297/403; 297/408; 297/344.1
[58] Field of Search ...................... 297/188.01, 188.04, 297/188.07, 146, 125, 217.6, 403, 408, 344.1; 312/223.3

[56] References Cited

U.S. PATENT DOCUMENTS

| | | |
|---|---|---|
| 446,632 | 2/1891 | Easte . |
| 1,325,630 | 12/1919 | Fair ................ 297/188.07 X |
| 1,704,415 | 3/1929 | Wenegrat ................ 297/217.6 |
| 2,015,315 | 9/1935 | McCackin ............ 297/188.07 X |
| 2,025,393 | 12/1935 | Kupfer ................ 297/188.07 X |
| 2,132,279 | 10/1938 | Wicknick et al. ...... 297/188.07 X |
| 2,136,407 | 11/1938 | Armour ................ 297/146 |
| 2,294,039 | 8/1942 | Looney ................ 297/188.07 |
| 2,383,125 | 8/1945 | Hill ................ 297/188.07 X |
| 2,619,395 | 11/1952 | Kent ................ 297/188.07 X |
| 3,104,131 | 9/1963 | Krone ................ 297/188.19 X |
| 3,131,968 | 5/1964 | Alt ................ 297/188.04 X |
| 3,449,011 | 6/1969 | Edwards et al. ........ 297/188.04 X |
| 3,467,425 | 9/1969 | Ferrara ................ 297/146 X |
| 3,615,118 | 10/1971 | Buxton ................ 297/188.07 |
| 3,795,422 | 3/1974 | Robinson et al. ................ 297/146 |
| 4,178,626 | 12/1979 | Marcus ................ 312/223.3 X |
| 4,466,659 | 8/1984 | Carpentier et al. ........ 297/188.06 |
| 4,711,494 | 12/1987 | Duvenkamp ................ 297/403 |
| 5,029,942 | 7/1991 | Rink ................ 297/188.07 X |
| 5,292,174 | 3/1994 | Ohnuma ................ 297/188.06 X |
| 5,322,344 | 6/1994 | Hoffman et al. . |
| 5,362,131 | 11/1994 | Susko et al. . |
| 5,375,907 | 12/1994 | Rogers et al. . |
| 5,492,257 | 2/1996 | Demick ................ 297/188.04 X |
| 5,516,191 | 5/1996 | McKee . |
| 5,524,959 | 6/1996 | Scott . |
| 5,542,589 | 8/1996 | McKee . |
| 5,556,017 | 9/1996 | Troy ................ 297/188.01 X |
| 5,628,439 | 5/1997 | O'Hara . |
| 5,681,079 | 10/1997 | Robinson ................ 297/403 X |
| 5,687,651 | 11/1997 | Hurayt et al. ................ 297/188.01 X |
| 5,713,633 | 2/1998 | Lu ................ 297/188.14 |
| 5,787,167 | 7/1998 | Anderson . |
| 5,816,650 | 10/1998 | Lucas, Jr. ................ 297/344.1 X |
| 5,863,092 | 1/1999 | Kifer ................ 297/188.04 |
| 5,878,672 | 3/1999 | Ostermann et al. ......... 297/188.06 X |

FOREIGN PATENT DOCUMENTS

| | | |
|---|---|---|
| 530819 | 3/1993 | European Pat. Off. . |
| 2380161 | 9/1978 | France . |
| 2753940 | 4/1998 | France . |
| 8815760 | 3/1989 | Germany . |
| WO9500360 | 1/1995 | WIPO . |

OTHER PUBLICATIONS

1999 Dodge Ram brochure, specifically page 4.

*Primary Examiner*—Peter M. Cuomo
*Assistant Examiner*—Rodney B. White
*Attorney, Agent, or Firm*—Harness, Dickey & Pierce, P.L.C.

[57] ABSTRACT

A seat back mounted fold down auto office having a bin portion mounted to the seat back of a vehicle seat assembly on the rear side thereof including a recessed storage area therein. A cover is provided for the recessed storage area and is rotatable upon a hinge to move the cover from a closed position to an open position to access the recessed storage area. Additional features include a fold out support panel that can rotate out from the storage bin toward a user after which the storage bin can be closed while the support panel extends from the storage bin. The support panel can be used to attach a notepad or and/or cellular telephone. In addition, the cover can be equipped with a light to illuminate the storage area in the bin.

32 Claims, 2 Drawing Sheets

SEAT BACK MOUNTED FOLD DOWN AUTO OFFICE

CROSS REFERENCE TO RELATED APPLICATIONS

This application claims priority from provisional application Ser. No. 60/070,328, filed Jan. 2, 1998.

BACKGROUND OF THE INVENTION

This invention generally relates to a mobile auto office system and, more particularly, to a storage and work surface module mounted to a vehicle seat back which can be moved to a generally horizontal position.

With the ever increasing use of cellular phones and lap top computers, more people are conducting business from their vehicles. While automotive manufacturers are providing more power outlets for such devices, there is currently a need within the industry to provide adequate and convenient storage and work surfaces within the vehicle to properly utilize these tools of business. Presently, most available devices that provide work surfaces are after market devices temporarily attached to either the windshield or instrument panel by suction cups or hook and loop fasteners. Further, many mobile office users improvise support surfaces by placing a briefcase or notebook on the seat cushion.

These piecemeal and improvised solutions to the problem of providing an adequate work surface within the vehicle often fail to position the work surface in a convenient location and do not provide solid surfaces upon which a significant amount of work can be conducted. Further, each of these solutions fails to provide adequate and secure storage for paper files, computers, cellular telephones or other items which are regularly used by people conducting business from their vehicles.

SUMMARY OF THE INVENTION

In accordance with the teachings of the present invention, a mobile auto office system is disclosed which provides storage and work surfaces for a user to conduct business from his or her vehicle. The system also provides conveniences which can be readily utilized for personal, non-business type uses during personal travel. The office system is generally mounted in a seat back which can be folded to a generally horizontal position and which is located adjacent to the user's seating position. The office system includes a bin portion for storing articles which are to be used and a cover to retain the items within the bin. The cover also provides storage for smaller items, or items that the user wishes to separate from the main storage area. The cover further provides a work surface when the seat back is in the folded down position and the cover is closed. Other amenities of the office system include a flip out notepad support panel which provides a writing surface on a first side and provides a cellular phone carriage bracket on a second side. The office system further includes connections for power to any devices used with the office system, as well as cellular phone connections, computer modem connections, and lights to illuminate the work surfaces or storage areas.

BRIEF DESCRIPTION OF THE DRAWINGS

The various advantages of the present invention will become apparent to one skilled in the art upon reading the following specification and by reference to the drawings which include.

DETAILED DESCRIPTION OF THE PREFERRED EMBODIMENT

Figures 1, 2:
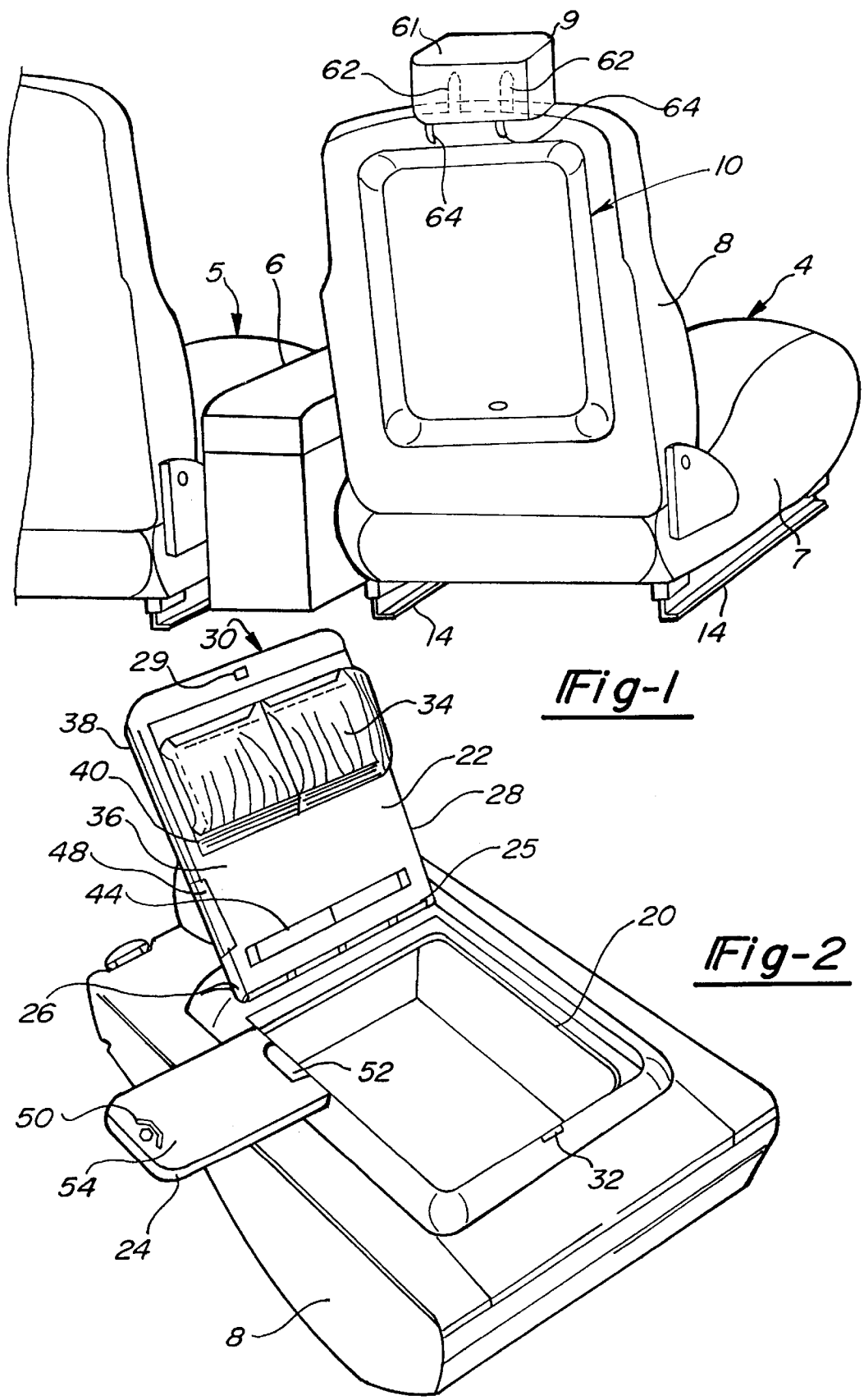
FIG. 1 is a perspective view of a vehicle front seating row with a seat assembly having the auto office of the present invention included therein.
FIG. 2 is a perspective view of the seat back in the folded forward position with the cover of the auto office system in the open position allowing access to the storage bin.

The following description of the preferred embodiment is merely exemplary in nature and is in no way intended to limit the invention or its application or uses.

Referring to the Figures, a passenger side front seat assembly 4 is shown and spaced from a driver seat assembly 5. A floor console 6 is located between the seat assemblies 4, 5. The two seat assemblies 4, 5 form a vehicle front seating row. The seat assembly 4 includes a generally horizontal seat cushion 7 and a seat back 8 extending upwardly from the rear end of the seat cushion 7. A head rest 9 extends from the seat back 8.

The auto office system of the present invention generally indicated at 10 and is secured to the rear of a seat back 8. The seat back 8 can be either raised to an occupant use position as shown in FIG. 1 or folded forward to an auto office use position shown in FIGS. 2 and 3. While the present embodiment is being described in relation to a seat back, office system 10 can be incorporated in a fold down armrest or other movable structure which is positioned generally adjacent to the user. The seat assembly 4 further includes a fore and aft adjuster in the form of tracks 14. The adjuster is used to move the seat cushion 7 and the seat back 8 fore and aft within a vehicle as is well known in vehicle seating.

Office system 10 of the preferred embodiment includes a storage bin portion 20, a cover 22, and a notepad support panel 24. The cover 22 is pivotally connected to the bin portion 20 by a hinge 25 along one side of the cover 22. The cover 22 may be hinged along any side but is preferably hinged along the forward edge 26, as determined when the seat back 8 is in the forward folded use position, or along the edge 28 opposite the user in FIG. 1.

Figure 3:
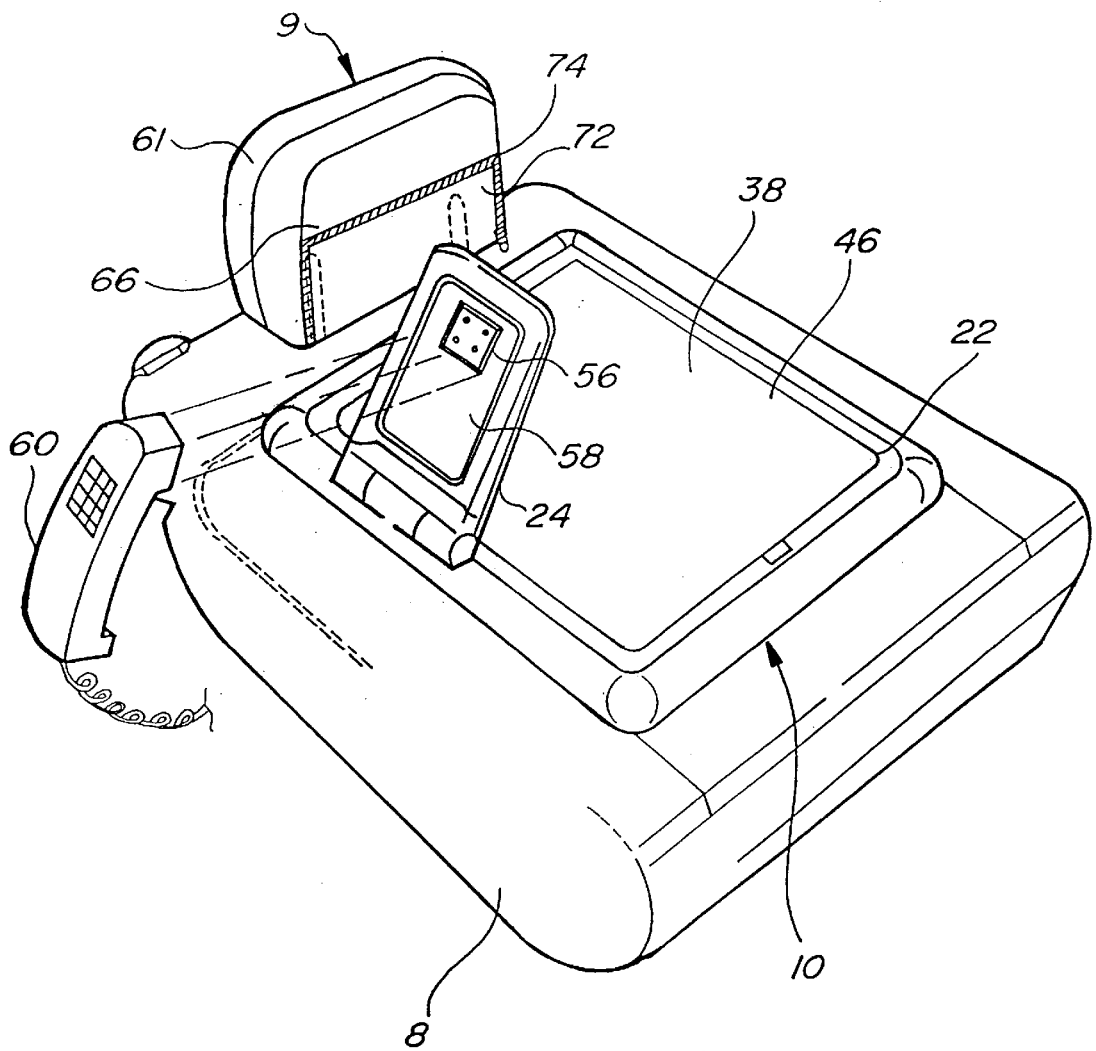
FIG. 3 is a perspective view, similar to FIG. 2, showing the cover of the auto office in the closed position with the support panel positioned to expose the cellular phone carriage bracket.

The cover 22 includes a first portion 29 of a latch 30 which is coordinated with a second portion 32 of the latch 30 which is attached to the bin portion 20. The latch 30 is intended to secure the cover 22 in the closed position when the seat back 8 is in the occupant use position as well as when the cover 22 is in the closed position and the seat back 8 is in the office use position. As shown, the cover 22 provides an inner surface 36 and an outer surface 38. The inner surface 36 provides attachments for storage pouches or bins 34 (either flexible or fixed in position) for storing items the user wishes to separate from the main storage area of the bin portion 20. Such items will typically include pens, pencils, computer disks, pads of paper, or file folders. The pouches or bins 34 may be removable to create greater storage space within the bin portion 20 or to allow the user to conveniently remove the pouches or bins 34 and carry the stored items with them in a convenient fashion. The cover 22 also provides a pen or pencil holder clip 40, and a light 44 to locally illuminate the storage area and the support panel 24 when the cover 22 is in the open position. The light 44 will generally be switchable and only activated when the cover 22 is in the open position. The outer surface 38 of the cover 22 can provide a smooth work surface for the user to write or work upon, or as shown in FIG. 3, can include an insert 46 (either carpet or fabric) to improve the aesthetic appearance of the seat back 8. The carpet or fabric insert provides a surface which readily interfaces with a hook and loop fastener (such as VELCRO®) which is attached to the bottom surface of a lap top computer to secure the computer and prevent sliding. When the office system 10 is incorporated in a seat assembly adjacent to a child, a variety of game or activity boards can be secured by the same hook and loop type fasteners. Particularly, checker or chess boards, interlocking block boards (such as those used with LEGO® blocks) or hand held video games can be secured as well as a wide variety of similar items.

The support panel 24 is pivotally attached to the bin portion 20 and is located in a position such that a notch or recess 48 in the cover 22 allows the support panel 24 to be in the laterally extending use position when the cover 22 is closed. The support panel 24 includes a clip 50 for holding a notepad and a pen holder 52 on a first surface 54. The support panel 24 further includes a phone carriage bracket 56 on a second surface 58 shown in FIG. 3. The second surface 58 can be accessed by pivoting support panel 24 to a semi-upright intermediate use position which locates the phone 60 in a convenient location for the user to dial and use the phone 60 in a hands-free manner if desired. The support panel 24 can alternately be attached to the cover 22 instead of to the bin portion 20. Further, the notch or recess 48 can be provided in the bin portion 20 instead of the cover 22 with equal results.

The head rest 9 is mounted to the seat back 8 such that when the seat back 8 is moved to a folded forward position shown in FIG. 3, the head rest rotates rearward 90° relative to the seat back and extends upwardly from the now horizontal seat back 8. The head rest body 61 is mounted on support posts 62. The posts 62 move through slots 64 in the seat back 8 to allow the head rest to rotate. The head rest body 61 can also include a pouch that is covered by a closure 72 and retained by a three-sided zipper 74 or other fasteners, such as hook and loop fasteners, snaps, etc. The closure 72 forms a portion of the rear surface 66 of the head rest body 61. The pouch can serve as a storage area for the cellular phone 60. The pouch on the rear of the head rest 9 can be easily accessed by the vehicle driver both when the seat back 8 is folded down and when it is in the upright use position shown in FIG. 1.

The foregoing discussion discloses and describes a preferred embodiment of the present invention. One skilled in the art will readily recognize from such discussion, and from the accompanying drawings and claims, that various changes, modifications, and variations can be made therein without departing from the true spirit and fair scope of the invention as defined in the following claims.

We claim:

1. A vehicle seat assembly comprising:
   a generally horizontal seat cushion having front and rear ends;
   a seat back at said rear end of said seat cushion and extending substantially upwardly in an occupant use position, said seat back being rotatably mounted for movement from said substantially upwardly extending occupant use position to a substantially horizontal folded forward auto office use position, said seat back having a rear side;
   a bin portion mounted to said seat back on said rear side thereof, said bin portion having a recessed storage area therein, said bin portion being operable to retain items storable in said bin portion and providing access to said recessed storage area when said seat back is in said auto office use position;
   a cover for said recessed storage area to conceal and retain items stored within said recessed storage area of said bin portion, and configured to provide access to said recessed storage area when said seat back is in said auto office use position; and
   a hinge pivotally mounting said cover to said bin portion for movement between a closed position in which said cover conceals and retains items stored within said recessed storage area and an open position in which said recessed storage area is accessible.

2. The vehicle seat assembly as defined in claim 1 wherein said hinge is secured to a forward edge of said cover as determined when said seat back is in said folded forward position.

3. The vehicle seat assembly as defined in claim 1 wherein said cover includes an inner surface having storage containers secured thereto.

4. The vehicle seat assembly as defined in claim 1 wherein said cover includes an inner surface and further comprising a light mounted to said cover on said inner surface for illuminating said recessed storage area when said cover is in said open position.

5. The vehicle seat assembly as defined in claim 1 further comprising a support panel mounted to said bin portion for rotation between a stowed position within said recessed storage area and a use position extending laterally from said bin portion.

6. The vehicle seat assembly as defined in claim 5 wherein said cover includes a notch coordinated with said support panel such that said cover can be positioned in a closed position when said support panel is in said laterally extending use position.

7. The vehicle seat assembly as defined in claim 5 wherein said bin portion includes a notch coordinated with said support panel such that said cover can be positioned in a closed position when said support panel is in said laterally extending use position.

8. The vehicle seat assembly as defined in claim 5 further comprising a clip on one surface of said support panel for attaching a note pad thereto.

9. The vehicle seat assembly as defined in claim 5 further comprising a telephone support bracket on one surface of said support panel for attaching a cellular telephone thereto.

10. The vehicle seat assembly as defined in claim 5 wherein said support panel rotates from said stowed position within said recessed storage area to said laterally extending use position in which a first surface of said support panel faces upward and a second surface faces downward, and further comprising a telephone support bracket on said second surface for attaching a cellular telephone thereto.

11. The vehicle seat assembly as defined in claim 10 wherein, when said cover is in said closed position, said support panel is rotatable from said laterally extending use position to an intermediate use position in which said second surface of said support panel faces laterally outward from said seat back.

12. The vehicle seat assembly as defined in claim 1 further comprising a fore and aft seat adjuster for adjusting the position of said seat cushion and said seat back within a vehicle body.

13. The vehicle seat assembly as defined in claim 1 wherein said seat cushion and said seat back are adapted to be mounted in a vehicle body at an outboard seating position.

14. The vehicle seat assembly as defined in claim 13 further comprising a support panel mounted to said bin portion for rotation between a stowed position within said recessed storage area and a use position extending laterally inward from said bin portion.

15. The vehicle seat assembly as defined in claim 1 further comprising:
   a head rest extending from said seat back, said head rest having a body with a rear surface; and
   a storage pouch in said head rest body with a movable closure forming a part of said rear surface of said head rest body.

16. A vehicle seat assembly comprising:
   a generally horizontal seat cushion having front and rear ends;
   a seat back at said rear end of said seat cushion and extending substantially upwardly in an occupant use position, said seat back being rotatably mounted for movement from said substantially upwardly extending occupant use position to a substantially horizontal folded forward auto office use position, said seat back having a rear side;
   a bin portion mounted to said seat back on said rear side thereof, said bin portion having a recessed storage area therein, said bin portion being operable to retain items storable in said bin portion and providing access to said recessed storage area when said seat back is in said auto office use position;
   a cover for said recessed storage area to conceal and retain items stored within said recessed storage area of said bin portion, and configured to provide access to said recessed storage area when said seat back is in said auto office use position; and
   a hinge pivotally mounting said cover to said bin portion for movement between a closed position in which said cover conceals and retains items stored within said recessed storage area and an open position in which said recessed storage area is accessible, said hinge being located at a forward edge of said cover as determined when said seat back is in said folded forward position whereby said cover rotates upward and forward to said open position.

17. The vehicle seat assembly as defined in claim 16 wherein said cover includes an inner surface having storage containers secured thereto.

18. The vehicle seat assembly as defined in claim 16 wherein said cover includes an inner surface and further comprising a light mounted to said cover on said inner surface for illuminating said recessed storage area when said cover is in said open position.

19. A vehicle seat assembly comprising:
   a generally horizontal seat cushion having front and rear ends;
   a seat back at said rear end of said seat cushion and extending upwardly in an occupant use position, said seat back being rotatably mounted for movement from said occupant use position to a folded forward position, said seat back having a rear side;
   a bin portion mounted to said seat back on said rear side thereof, said bin portion having a recessed storage area therein;
   a cover for said recessed storage area to conceal and retain items stored within said recessed storage area of said bin portion, said cover being pivotally secured adjacent to said bin portion, said cover having a closed position; and
   a support panel pivotally mounted to said bin portion and having a stowed position within said recessed storage area and a use position extending from said bin portion, wherein said support panel is operable to be positioned in multiple use positions when said cover is in said closed position.

20. The vehicle seat assembly as defined in claim 19 further comprising a clip on one surface of said support panel for attaching a note pad thereto.

21. The vehicle seat assembly as defined in claim 19 further comprising a telephone support bracket on one surface of said support panel for attaching a cellular telephone thereto.

22. The vehicle seat assembly as defined in claim 19 wherein said support panel rotates from said stowed position within said recessed storage area to said laterally extending use position in which a first surface of said support panel faces upward and a second surface faces downward, and further comprising a telephone support bracket on said second surface for attaching a cellular telephone thereto.

23. The vehicle seat assembly as defined in claim 22 wherein, when said cover is in said closed position, said support panel is rotatable from said laterally extending use position, toward said stowed position, to an intermediate use position in which said second surface of said support panel faces laterally outward from said seat back.

24. A vehicle seat assembly comprising:
   a generally horizontal seat cushion having front and rear ends;
   a seat back at said rear end of said seat cushion and extending upwardly in an occupant use position, said seat back being rotatably mounted for movement from said occupant use position to a folded forward position, said seat back having a rear side;
   a bin portion mounted to said seat back on said rear side thereof, said bin portion having a recessed storage area therein;
   a cover for said recessed storage area to conceal and retain items stored within said recessed storage area of said bin portion said cover being, pivotally mounted adjacent to said bin portion; and
   a support panel pivotally mounted adjacent to said bin portion, wherein one of said bin portion and said cover includes a notch coordinated with said support panel such that said cover can be positioned in a closed position when said support panel is in an extended use position.

25. A vehicle seat assembly comprising:
   a generally horizontal seat cushion having front and rear ends;
   a seat back at said rear end of said seat cushion and extending upwardly in an occupant use position, said seat back being rotatably mounted for movement from said occupant use position to a folded forward position, said seat back having a rear side;
   a bin portion mounted to said seat back on said rear side thereof, said bin portion having a recessed storage area therein;
   a cover for said recessed storage area to conceal and retain items stored within said recessed storage area of said bin portion;
   a hinge pivotally mounting said cover to said bin portion for movement between a closed position in which said cover conceals and retains items stored within said recessed storage area and an open position in which said recessed storage area is accessible; and
   a support panel pivotally mounted adjacent to said bin portion and having an extended use position, wherein one of said bin portion and said cover include a notch coordinated with said support panel such that said cover can be positioned in said closed position when said support panel is in said extended use position.

26. An auto office system comprising:
- a bin portion adapted to be mounted in a vehicle and having a generally horizontal use position, said bin portion having a recessed area therein;
- a cover pivotally secured adjacent to said recessed area, said cover having an open position and a closed position; and
- a support panel pivotally secured adjacent to said recessed area, said support panel having a stowed position within said recessed area and a use position extending from said recessed area, wherein said support panel is operable to be positioned in multiple use positions when said cover is in said closed position.

27. The auto office system as defined in claim 26 further comprising a clip on one surface of said support panel for attaching a note pad thereto.

28. The auto office system as defined in claim 26 further comprising a telephone support bracket on one surface of said support panel for attaching a cellular telephone thereto.

29. The auto office system as defined in claim 26, wherein said support panel rotates from said stowed position within said recessed storage area to said laterally extending use position in which a first surface of said support panel faces upward and a second surface faces downward, and further comprising a telephone support bracket on said second surface for attaching a cellular telephone thereto.

30. The auto office system as defined in claim 29 wherein, when said cover is in said closed position, said support panel is rotatable from said laterally extending use position to an intermediate use position in which said second surface of said support panel faces laterally from said bin portion.

31. The auto office system as defined in claim 26 wherein one of said bin portion and said cover include a notch coordinated with said support panel such that said cover can be positioned in said closed position when said support panel is in said extended use position.

32. The auto office system as defined in claim 19 wherein one of said bin portion and said cover include a notch coordinated with said support panel such that said cover can be positioned in said closed position when said support panel is in said extended use position.

* * * * *